United States Patent [19]

Yamaguchi et al.

[11] 4,392,293
[45] Jul. 12, 1983

[54] METHOD OF ASSEMBLING COMBINATION SHOCK ABSORBER AND AIR SPRING

[75] Inventors: Kiyoshi Yamaguchi; Naoki Makita, both of Yokohama, Japan

[73] Assignee: Tokico Ltd., Kanagawa, Japan

[21] Appl. No.: 193,104

[22] Filed: Oct. 2, 1980

[30] Foreign Application Priority Data

Oct. 8, 1979 [JP] Japan ................................ 54/129769

[51] Int. Cl.³ ............................................. B23P 19/00
[52] U.S. Cl. ....................................... 29/436; 29/450; 29/451; 29/235; 29/516; 267/64.24
[58] Field of Search ................. 29/434, 436, 516, 517, 29/235, 450, 451; 188/322.17; 267/64.24

[56] References Cited

U.S. PATENT DOCUMENTS

| 2,506,079 | 5/1950 | Grant | 29/235 |
| 2,998,049 | 8/1961 | Winslow | 29/235 X |
| 3,046,002 | 7/1962 | Schmitz | 267/64.24 |
| 3,057,355 | 10/1962 | Smialowski et al. | 29/235 UX |
| 3,149,830 | 9/1964 | Broadwell | 267/64.24 |
| 3,176,388 | 4/1965 | Dutton | 29/235 X |
| 3,180,337 | 4/1965 | Smialowski | 29/235 X |
| 3,313,536 | 4/1967 | Dutton et al. | 29/516 UX |
| 3,744,123 | 7/1973 | Vers | 188/322.17 X |
| 3,797,816 | 3/1974 | Voss | 267/64.24 |
| 3,967,363 | 7/1976 | Meyer | 29/235 X |
| 4,206,538 | 6/1980 | Hayes et al. | 29/235 X |

Primary Examiner—Charlie T. Moon
Attorney, Agent, or Firm—Wenderoth, Lind & Ponack

[57] ABSTRACT

A method is provided for assembling a combination shock absorber and air spring including a tubular shock absorber having an outer tube and a piston rod reciprocably projecting from one end of the outer tube, and an air spring consisting of a resilient diaphragm member having an outer wall portion connected to a cylindrical housing secured to the projecting end of the piston rod, an inner concentric wall portion secured to the outer tube, and a rolling wall portion formed between the inner and outer wall portions. The method comprises the steps of expanding radially outwardly and rolling back one end portion of a tubular resilient diaphragm member to form the outer wall portion and the rolling wall portion, fitting a retaining ring on the inner surface of the outer wall portion, fitting the tubular resilient diaphragm member on the outer tube of the shock absorber and securing the other end portion of the diaphragm member thereto, and securing the outer wall portion of the cylindrical housing by utilizing the retaining ring.

3 Claims, 11 Drawing Figures

Fig. 5
Fig. 6
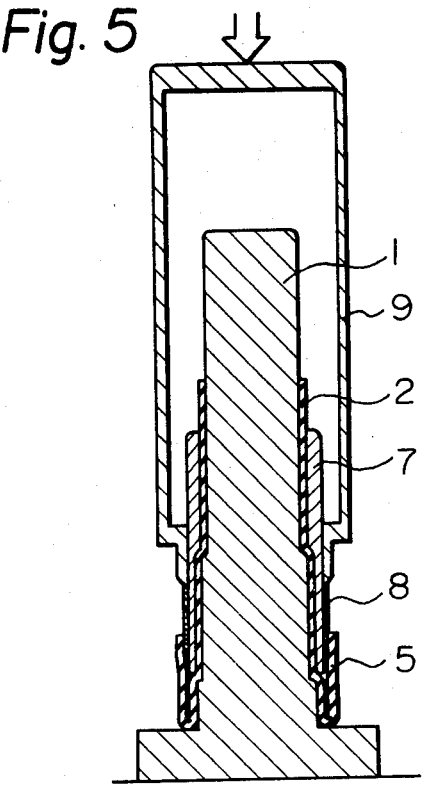
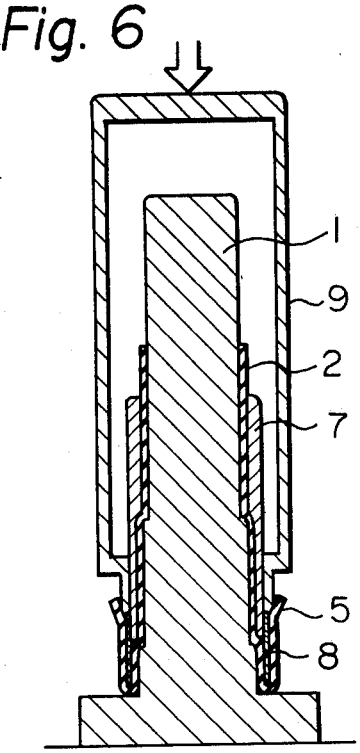
Fig. 7
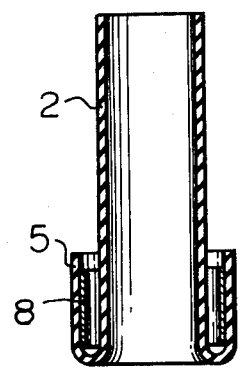

METHOD OF ASSEMBLING COMBINATION SHOCK ABSORBER AND AIR SPRING

BACKGROUND OF THE INVENTION

This invention relates to a combination shock absorber and air spring which is adapted for use in a vehicle suspension system and, particularly to a method of assembling the same.

A combination shock absorber and air spring usually comprises a tubular shock absorber having an outer tube and a piston rod reciprocably projecting from one end of the outer tube, and an air spring consisting of a resilient diaphragm member having an outer wall portion connected to a cylindrical housing which is secured to the projecting end of the piston rod, an inner concentric wall portion secured to the outer tube of the shock absorber, and a rolling wall portion formed between the inner and outer wall portions.

A typical prior art method of assembling the combination shock absorber and air spring comprises the steps of, as shown in U.S. Pat. Nos. 3,313,536 and 3,967,363, inserting the outer tube of the shock absorber into a tubular resilient diaphragm member, securing one end portion of the diaphragm member to the outer tube, clamping the other end portion of the resilient diaphragm member to radially outwardly expand and to pull backward, thereby forming the rolling wall portion and the outer wall portion, and, thereafter, securing the free end of the outer wall portion to the cylindrical housing. However, there are shortcomings such that the process clamping of the other end portion of the diaphragm member and radially outwardly expanding and pulling backward the same is relatively difficult, and that the clamped end portion of the diaphragm member will sometimes be damaged. Further, since the outer tube of the damper is substantially covered by the diaphragm member in fitting the diaphragm member on the outer tube of the shock absorber, it thus is difficult to employ the method on a shock absorber having a spring seat, a knuckle spindle or the like secured to the outer tube of the shock absorber. In the prior art method, such parts have been secured to the outer tube after assembling the shock absorber and the air spring, thereby complicating the assembling operation.

SUMMARY OF THE INVENTION

The present invention aims to avoid the shortcomings aforementioned and, according to the invention, there is provided a method comprising the steps of: expanding radially outwardly and rolling back one end portion of a tubular resilient diaphragm member to form the outer wall portion and the rolling wall portion, fitting a retaining ring on the inner surface of the outer wall portion, fitting the tubular resilient diaphragm member on the outer tube of the shock absorber, securing the other end portion of the resilient diaphragm member to the outer tube, locating the free end of the outer wall portion of the resilient diaphragm member in the cylindrical housing which is secured to the piston rod, and securing the outer wall portion to the housing by utilizing the retaining ring.

Preferably, the tubular diaphragm member is firstly mounted on a mandrel having steppingly increasing diameters, and by displacing the diaphragm member along the mandrel, the diameter of the one end portion of the diaphragm member can easily be expanded and the rolling back process can easily and reliably be performed.

BRIEF DESCRIPTION OF THE DRAWINGS

The present invention will be explained further in conjunction with accompanying drawings, in which:

FIG. 5 is an explanatory view showing the step of fitting a retaining ring on the resilient diaphragm member according to the invention;

FIG. 6 is an explanatory view showing the retaining ring being properly fitted on the resilient diaphragm member.

FIG. 7 is an explanatory view of a resilient diaphragm assembly consisting of a resilient diaphragm member having inner and outer wall portions and rolling wall portion, and the retaining ring fitted on the outer wall portion;

DETAILED DESCRIPTION OF THE PREFERRED EMBODIMENTS

The method of assembling a combination shock absorber and air spring according to the invention will now be explained with reference to FIGS. 1-9.

Figure 1:
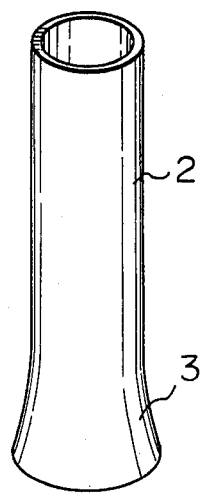
FIG. 1 is a perspective view showing a tubular resilient diaphragm member.
Figure 2:
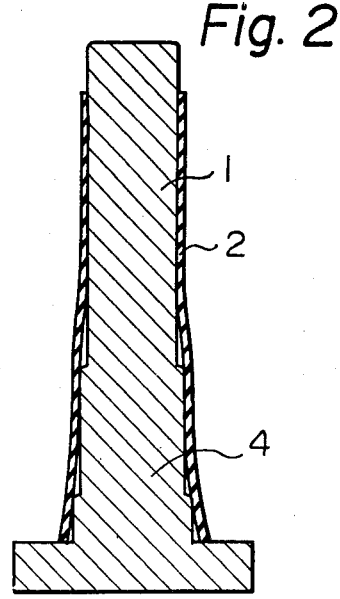
FIG. 2 is a sectional view of the tubular resilient diaphragm member of FIG. 1 fitted on a mandrel.

Firstly, a tubular resilient diaphragm member 2 having a flared end portion 3 as shown in FIG. 1 is fitted on a mandrel 1 having steppingly increasing outer diameters as shown in FIG. 2.

Figure 3:
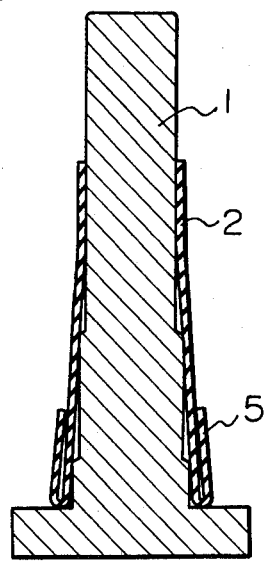
FIG. 3 is an explanatory view showing the step of expanding radially outwardly and rolling back the tubular resilient diaphragm member according to the invention.

The flared end portion 3 is directed toward an end portion 4 of the mandrel having an increased diameter. Preferably, lubricants such as silicon oil is applied on the mandrel 1. The flared end portion 3 is expanded radially outwardly and rolled backward while displacing downward as shown in the drawing, the diaphragm member 2 along the mandrel 1, thereby forming a rolled back portion 5 as shown in FIG. 3 which constitutes the outer wall portion of the resilient diaphragm member 2 in the final product.

Figure 4:
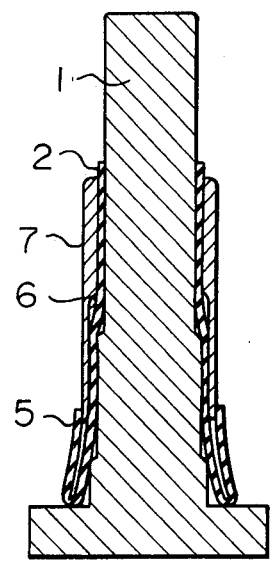
FIG. 4 is an explanatory view showing the step of fitting a guide ring on the resilient diaphragm member according to a preferred process of the invention.

A guide ring 7 having an increased diameter bore portion 6 on the inner surface of the forward end thereof is inserted between the rolled back portion 5 and the remaining portion of the diaphragm member 2 as shown in FIG. 4. A retaining ring 8 is slidably fitted on the guide ring 7 and is pushed forward along the guide ring 7 by a pushing member 9 as shown in FIGS. 5 and 6 so as to fit with the inner surface of the rolled back portion 5. Thereafter, the pushing member 9, the guide ring 7 and the mandrel 1 are removed to obtain a tubular diaphragm assembly 12 including the outer wall portion, a concentric inner wall portion and a rolling wall portion as shown in FIG. 7. The retaining ring 8 effectively prevents the assembly 12 from returning to the initial condition.

The tubular diaphragm assembly 12 is fitted on an outer tube 18 of a tubular shock absorber 13 and the free end 20 of the inner wall portion of the tubular diaphragm assembly 12 is secured to the outer tube 18 by utilizing another retaining ring 19 which is preferably fitted on the inner wall portion of the diaphragm assembly 12 beforehand. A cap member 15 is secured to the projecting end 14a of a piston rod 14 of the shock absorber 13 by such as welding and one end 16a of a cylindrical member 16 is secured to the cap 15 by such as welding. The cap 15 and the cylindrical member 16 constitute the cylindrical housing according to the invention. Mounting rings 17 and 21 are respectively secured to the piston rod 14 and the outer tube 18 of the shock absorber as shown in FIG. 8.

Figure 9:
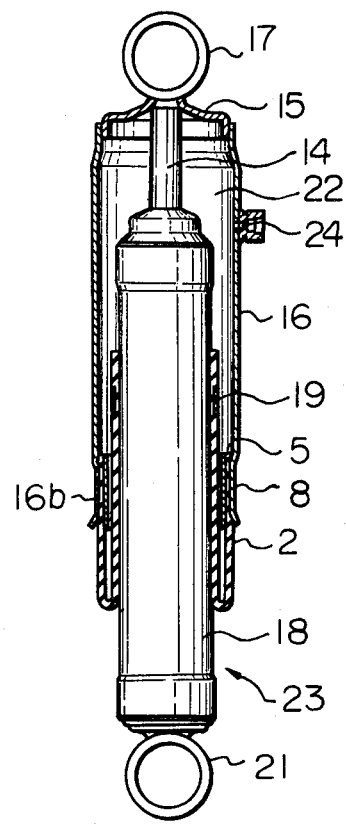
FIG. 9 is an explanatory view showing the combination shock absorber and air spring according to the invention.

The length of the shock absorber 13 is reduced by applying a contracting force so that at least a part of the outer wall portion of the diaphragm assembly 12 is fitted in the open end 16b of the cylindrical member 16. The outer wall portion of the diaphragm assembly 12 is secured to the cylindrical member 16 by utilizing the retaining ring 8, as shown in FIG. 9. Thereby, a combination shock absorber and air spring 23 having a closed chamber 22 for receiving pressurized air has been fabricated. The closed chamber 22 has an opening 24 for receiving or discharging the pressurized air.

Figure 8:
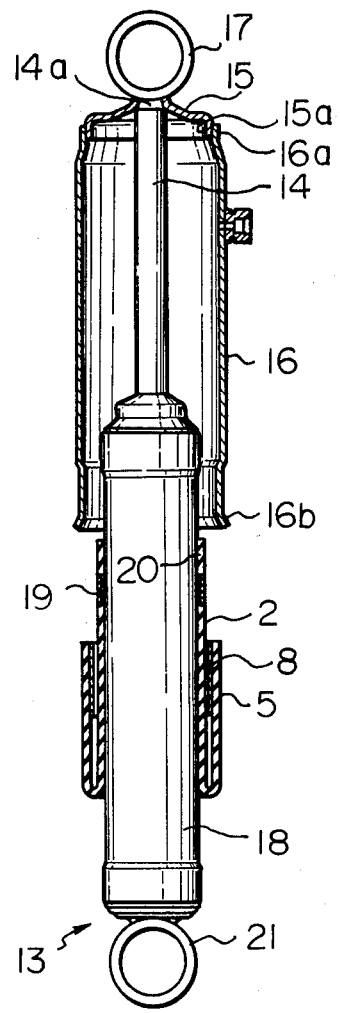
FIG. 8 is an explanatory view showing the resilient diaphragm assembly of FIG. 7 being fitted on the outer tube of a shock absorber.

In FIG. 8, the diaphragm assembly 12 is preferably fitted on the hydraulic shock absorber 13 from the lower end of the outer tube 18 with the mounting ring 21 not being secured thereto, however, the diaphragm assembly 12 may be fitted on the shock absorber 13 from the upper end of the outer tube 18 with the mounting ring 17 being secured thereto, and the cap 15 and the cylindrical member 16 not being secured to the piston rod 14 of the shock absorber 13. Such examples are shown in FIGS. 10 and 11.

Figure 10:
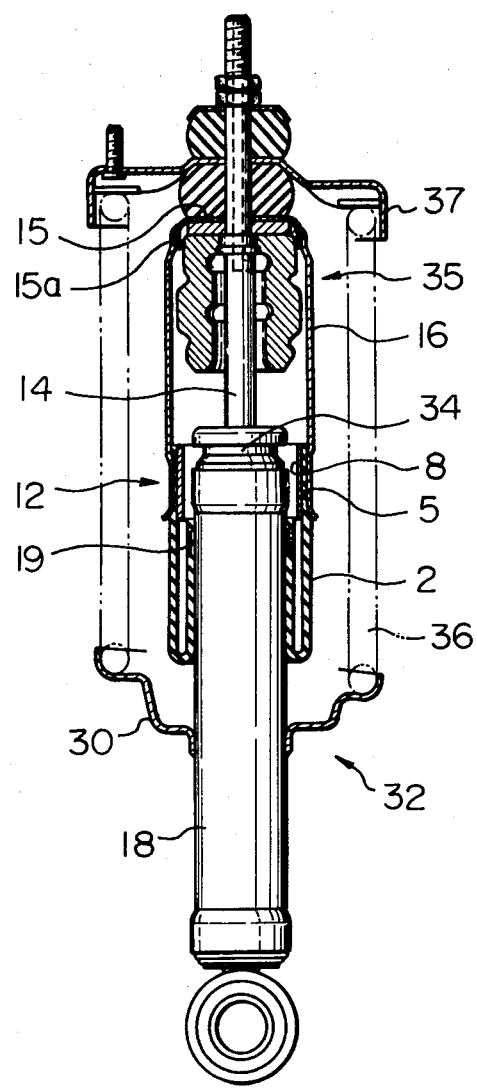
FIGS. 10 and 11 are explanatory views showing modified forms of FIG. 9.
Figure 11:
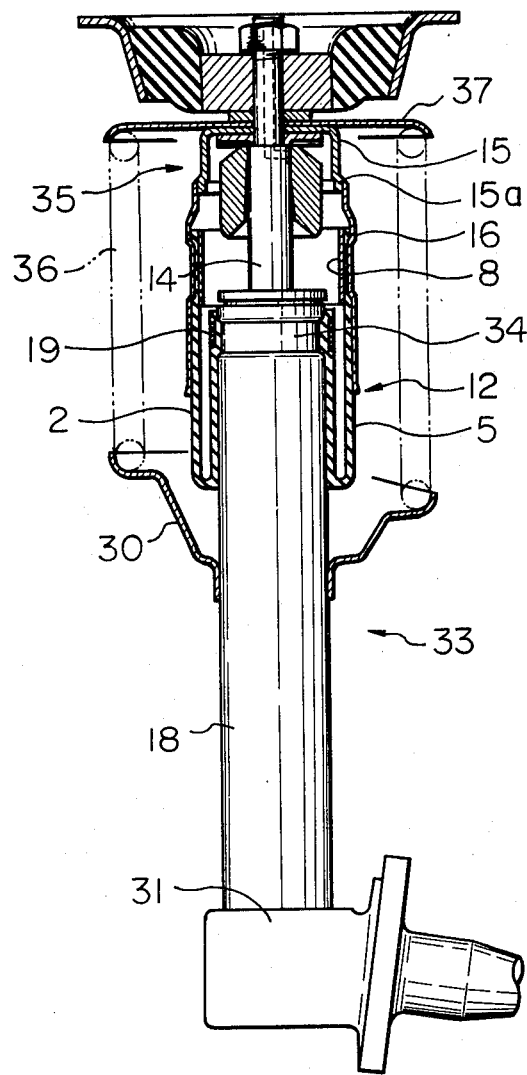

In FIGS. 10 and 11, a spring seat 30 is secured to the outer tube 18 of the shock absorber and, therefore, the diaphragm assembly 12 cannot be fitted on the outer tube 18 from the lower end thereof. Further, in FIG. 11, a knuckle spindle 31 is integrally mounted on the lower end of the outer tube 18 of the shock absorber. Thus, the diaphragm assembly 12 is fitted on the outer tube 18 with the piston rod 14 passing through the diaphragm assembly 12. Then, the inner wall portion of the diaphragm assembly 12 is secured to the outer tube 18 by utilizing the retaining ring 19. Thereafter, a bumping rubber and related parts, and the cap member 15 with the cylindrical member 16 secured thereto are mounted on the outer end of the piston rod 14, and the outer wall portion of the diaphragm assembly 12 is secured to the tubular member 16 by utilizing the retaining ring 8 with the piston rod 14 being temporarily compressed. Thereafter, a coil spring 36, a spring retainer 37, and mounting members are secured to the piston rod 14.

As described heretofore, according to the invention, a tubular diaphragm assembly 12 having inner and outer wall portions and rolling wall portion is assembled with the outer tube of the shock absorber. Thus, the axial length of the tubular diaphragm in the assembling process can be reduced as compared with prior art method, and, parts such as spring retainer 30 may be secured on the outer tube of the shock absorber beforehand. Further, one end portion of the tubular diaphragm 2 is radially outwardly expanded and rolled back on the mandrel 1 to form the outer wall portion, and the retaining ring 8 is fitted thereon to form the tubular diaphragm assembly 12 having inner and outer wall portions thereby preventing the tubular diaphragm assembly 12 from returning to the initial. Thus, it is possible to avoid damage of the tubular diaphragm during the rolling back process, and the working property can be improved.

What is claimed is:

1. A method of assembling a combination shock absorber and air spring including a tubular shock absorber having an outer tube and a piston rod reciprocably projecting from one end of the outer tube, and an air spring consisting of a resilient diaphragm member having an outer wall portion connected to a cylindrical housing secured to the projecting end of the piston rod, an inner concentric wall portion secured to the outer tube of the shock absorber, and a rolling wall portion formed between said inner and outer wall portions, the method comprising the steps of:

expanding radially outwardly and rolling back one end portion of a tubular resilient diaphragm member to form the outer wall portion and the rolling wall portion, while preventing deformation radially inwardly of the remaining portion of said resilient diaphragm member, said expanding and rolling back of said resilient diaphragm member being performed by fitting said resilient diaphragm member on a mandrel having steppingly increasing outer diameters, and displacing said resilient diaphragm member along said mandrel while abutting said one end portion of said resilient diaphragm member against a surface of said mandrel and thereby inverting said resilient diaphragm member;

fitting a retaining ring on the inner surface of the outer wall portion;

fitting the tubular resilient diaphragm member on the outer tube of the shock absorber;

securing the other end portion of the resilient diaphragm member to the outer tube of the shock absorber;

locating the free end of the outer wall portion of resilient diaphragm member in the cylindrical housing secured to the piston rod; and securing the free end of the outer wall portion within the cylindrical housing by utilizing the retaining ring.

2. An assembling method as set forth in claim 1, wherein the other end portion of the resilient diaphragm member is secured to the outer tube of the shock absorber by utilizing another retaining ring.

3. An assembling method as set forth in claim 1, wherein the retaining ring fitting process is performed by fitting a generally tubular guide ring having steppingly increasing inner diameters over the outer surface of the resilient diaphragm member while the resilient diaphragm member is fitted on the mandrel, fitting the retaining ring over the outer surface of the guide ring, and slidingly displacing the retaining ring along the outer surface of the guide ring until the retaining ring is fitted on the inner surface of the outer wall portion of the resilient diaphragm member.

* * * * *